E. GIBSON & J. BURNS.
GASKET TOOL.
APPLICATION FILED MAY 25, 1909.
971,672.
Patented Oct. 4, 1910.
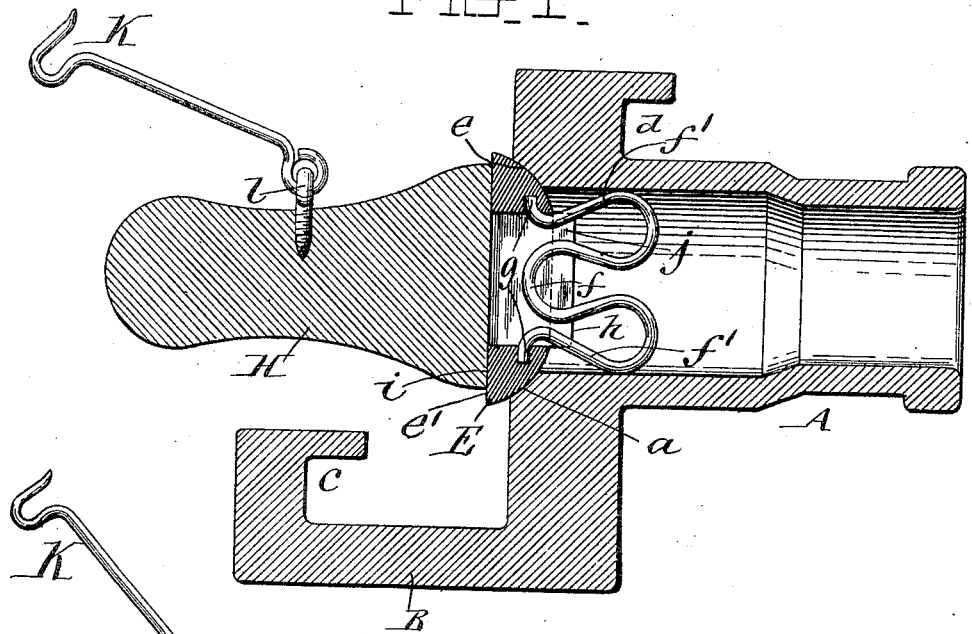
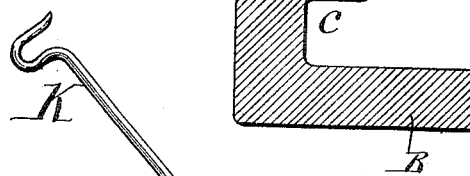
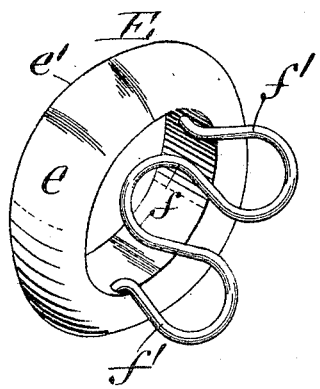
Witnesses:
J. Milton Jester
Richard Sommer
Inventors:—
Edwin Gibson
John Burns
by Geyer & Popp
Attorneys.

UNITED STATES PATENT OFFICE.

EDWIN GIBSON AND JOHN BURNS, OF HORNELL, NEW YORK.

GASKET-TOOL.

971,672.   Specification of Letters Patent.   Patented Oct. 4, 1910.

Application filed May 25, 1909. Serial No. 498,354.

*To all whom it may concern:*

Be it known that we, EDWIN GIBSON and JOHN BURNS, citizens of the United States, and residents of Hornell, in the county of Steuben and State of New York, have invented a new and useful Improvement in Gasket-Tools, of which the following is a specification.

In one of the steam heating systems for railway cars now in common use the heads of the couplings for connecting the flexible steam hose of adjacent cars are provided with gaskets whereby a tight joint is produced between opposing heads, these gaskets being held frictionally in place by means of springs secured to the gaskets and engaging with the bore of the heads. Considerable difficulty is now experienced by operators in applying these gaskets to the coupling heads and also in removing the same when worn for the purpose of replacing them by new ones.

It is the object of this invention to provide a tool of simple, durable and inexpensive construction whereby the gaskets may be quickly, conveniently and easily applied to and removed from the coupling heads.

In the accompanying drawings: Figure 1 is a longitudinal section of a coupling head and gasket showing our improved gasket tool engaging therewith in position to apply the gasket to the coupling head. Fig. 2 is a detached perspective view of the gasket tool. Fig. 3 is a similar view of the gasket.

Similar letters of reference indicate corresponding parts throughout the several views.

The coupling head of the steam heating system comprises a tubular body A having an annular concave seat $a$ at its front or outer end and adapted to be connected at its rear end with the steam hose or other conduit, an arm B projecting forwardly from the body on one side thereof, a front hook $c$ arranged on the inner side of said arm, and a rear hook $d$ arranged on the opposite side of the body, said front and rear hooks $c$, $d$ being adapted to engage with similar rear and front hooks of the tubular body and arm of an opposing coupling head when connecting the steam lines, hose or pipes of two cars in a well known manner.

E represents the gasket which is of annular form and provided with a convex rear face $e$ which engages with the concave seat of the tubular body and having a flat front face $e^1$ which is adapted to engage with the corresponding face of the opposing gasket of another coupling head for producing a steam tight joint between the same. This gasket is held in place on the coupling head by a retaining spring arranged on the inner or rear side of the gasket and composed of a central forwardly projecting loop $f$ and two curved arms $f^1$, $f^1$ which project forwardly from the opposite rear ends of the loop and are provided at their front ends with laterally projecting spurs $g$ which engage with notches in opposite sides of the bore of the gasket. The rear parts of these spring arms normally are separated a distance greater than the diameter of the bore of the tubular body of the coupling head, so that upon pushing or driving the same into this body until the gasket engages the seat $a$ these arms will be contracted and hold the gasket frictionally in place on the head.

In order to avoid losing the gasket, its head is not coupled with another head; the retaining spring is made comparatively stiff which renders the application of the gasket to the head and the removal of the same therefrom difficult by the means heretofore employed for this purpose. To permit of performing these operations more easily, conveniently and expeditiously the gasket tool forming the subject of this invention is provided, the same being constructed as follows:—

H indicates a handle preferably of circular form and of a suitable length to permit of convenient manipulation by one hand. This handle is provided with a reduced front part $h$ of cylindrical form. At the junction of the enlarged rear part and the reduced front part of the handle the same is provided with an annular shoulder $i$. In the reduced front part of the handle is formed a diametrical slot $j$ which extends rearwardly from the front end of this reduced part.

In using this tool for applying the gasket to a coupling head the periphery of the reduced part of the handle engages with the bore of the gasket, its shoulder $h$ bears against the flat outer face of the gasket and the slot $j$ thereof receives the spring of the gasket. In this position of the gasket on the handle the former may be reliably held in place and conveniently and easily pushed or driven by the latter into the tubular body of the coupling head, so that the spring engages with the bore of the body and the gasket engages the seat thereof, as shown in Fig. 1, after which the handle may be withdrawn without the gasket and spring.

For removing the gasket from the coupling head, the handle is provided with a hook K which is preferably loosely connected with the central part of the side of the handle by a screw $l$, as shown in Figs. 1 and 2. Upon engaging the hook K with the central loop of the gasket spring and exerting an outward pull on the same by means of the handle, the gasket can be removed from the coupling head easily and quickly.

Owing to the rapidity, facility and convenience with which gaskets can be removed from and applied to coupling heads, repairing of the steam heating system can be effected with a minimum loss of time or interruption of the train service, and effecting a corresponding saving in maintenance.

We claim as our invention:

1. A gasket tool comprising a handle having a reduced part at its front end and a slot in said reduced part for receiving the spring of the gasket.

2. A gasket tool comprising a handle having a reduced cylindrical front part forming a forwardly facing shoulder between the handle and its reduced front part and the latter having a diametrical slot extending from its front end rearwardly, the periphery of said front part being adapted to engage with the bore of a gasket, said shoulder being adapted to engage with the face of the gasket, and said slot being adapted to receive a diametrical spring which is arranged on the gasket.

Witness our hands this 20th day of May, 1909.

EDWIN GIBSON.
JOHN BURNS.

Witnesses:
C. H. KURTZ,
JAMES W. SMITH.